United States Patent
Rodriguez

(10) Patent No.: US 10,668,786 B2
(45) Date of Patent: Jun. 2, 2020

(54) HVAC REGISTER RECALL POSITION SYSTEM

(71) Applicant: DENSO International America, Inc., Southfield, MI (US)

(72) Inventor: Javier Rodriguez, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 319 days.

(21) Appl. No.: 15/700,966

(22) Filed: Sep. 11, 2017

(65) Prior Publication Data

US 2019/0077218 A1    Mar. 14, 2019

(51) Int. Cl.
*B60H 1/00* (2006.01)
*B60H 1/34* (2006.01)

(52) U.S. Cl.
CPC ..... *B60H 1/00871* (2013.01); *B60H 1/00835* (2013.01); *B60H 1/00971* (2013.01); *B60H 1/3414* (2013.01); *B60H 2001/3471* (2013.01)

(58) Field of Classification Search
CPC ............ B60H 1/00971; B60H 1/00871; B60H 1/00835; B60H 1/3414; B60H 2001/3471
See application file for complete search history.

(56) References Cited

U.S. PATENT DOCUMENTS

| 6,012,297 A | * | 1/2000 | Ichishi | B60H 1/00871 165/203 |
| 7,741,959 B2 | | 6/2010 | Obradovich | |
| 2014/0373563 A1 | * | 12/2014 | Mizutani | B60H 1/00807 62/186 |
| 2017/0045890 A1 | * | 2/2017 | Gurin | G06Q 10/0836 |

FOREIGN PATENT DOCUMENTS

| JP | 11208246 | * | 8/1999 |
| JP | 2005-55061 | * | 5/2005 |

* cited by examiner

*Primary Examiner* — Steven S Anderson, II
(74) *Attorney, Agent, or Firm* — Harness, Dickey & Pierce, P.L.C.

(57) ABSTRACT

A system for controlling airflow of a heating, ventilation, and air conditioning (HVAC) system. The system includes a register including airflow directionals. A motor is connected to the register to move the directionals. A directionals selector is connected to the motor to control the motor. Actuation of the directionals selector by a user changes position of the directionals. A control module stores predetermined positions of the directionals, and controls the motor to move the directionals to the predetermined positions in response to receipt of a user command.

7 Claims, 2 Drawing Sheets

HVAC REGISTER RECALL POSITION SYSTEM

FIELD

The present disclosure relates to a register recall position system for a heating, ventilation, and air conditioning (HVAC) system.

BACKGROUND

This section provides background information related to the present disclosure, which is not necessarily prior art.

Heating, ventilation, and air conditioning (HVAC) systems, particularly vehicle HVAC systems, typically include face registers for directing airflow. The face registers can be moved to positions that provide the most comfort to a driver of the vehicle, but must be moved manually. Thus, once a first driver manually moves the face registers to positions of the first driver's liking, a second driver must manually readjust the face registers to positions of the second driver's liking. While existing HVAC registers are suitable for their intended use, they are subject to improvement. The present teachings advantageously include an HVAC register recall position system that provides numerous advantages over current HVAC registers, as explained herein and as one skilled in the art will recognize.

SUMMARY

This section provides a general summary of the disclosure, and is not a comprehensive disclosure of its full scope or all of its features.

The present teachings include a system for controlling airflow of a heating, ventilation, and air conditioning (HVAC) system. The system includes a register including airflow directionals. A motor is connected to the register to move the directionals. A directionals selector is connected to the motor to control the motor. Actuation of the directionals selector by a user changes position of the directionals. A control module stores predetermined positions of the directionals, and controls the motor to move the directionals to the predetermined positions in response to receipt of a user command.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
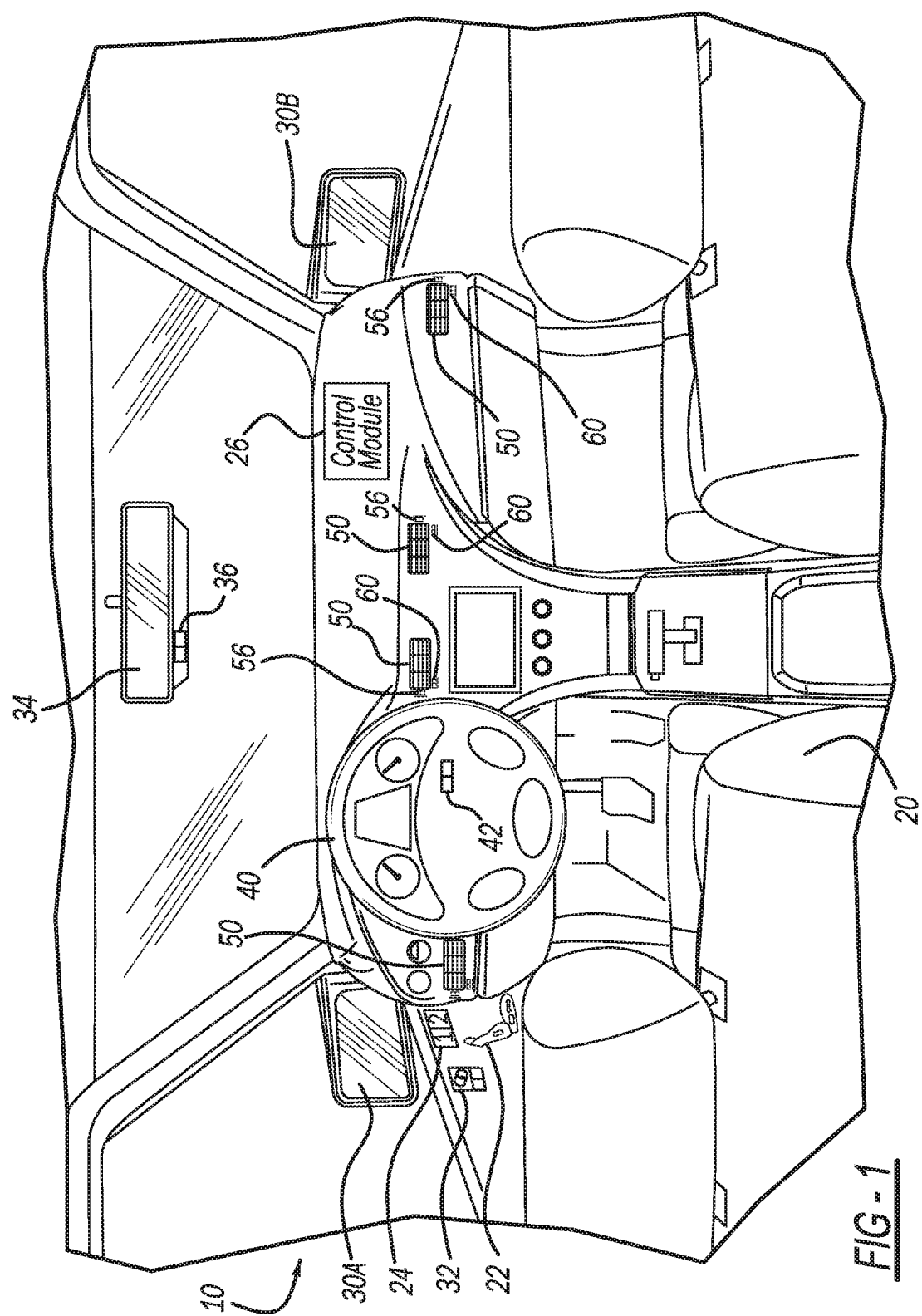
FIG. 1 illustrates a passenger cabin of a vehicle including an HVAC register positioning system according to the present teachings.

FIG. 1 illustrates a vehicle 10 including a system in accordance with the present teachings for controlling airflow of a heating, ventilation, and air conditioning (HVAC) system of the vehicle 10. The vehicle 10 can be any suitable vehicle, such as any suitable passenger vehicle, mass transit vehicle, emergency vehicle, military vehicle, construction equipment, watercraft, aircraft, etc. FIG. 1 illustrates the vehicle 10 as an exemplary passenger vehicle.

The passenger cabin of the exemplary vehicle 10 generally includes a seat 20 for a driver. The seat 20 can be electrically adjusted, such as by actuating any suitable seat control 22, which in FIG. 1 is illustrated as mounted at a door of the vehicle 10. The seat 20 can be adjusted in any suitable manner. For example, the seat 20 can be moved forward, backward, up, and down. Furthermore, a seat back of the seat 20 can be inclined or reclined. A headrest of the seat 20 can also be moved.

Once the seat 20 is moved to a desired position, a customization selector 24 can be actuated. Upon actuation of the customization selector 24, such as by holding down a button thereof for a predetermined period (such as three seconds, for example) a control module 26 will store the position of the seat 20 as a predetermined position, such as a first predetermined position. Using the seat control 22, the seat can be repositioned, and this new position of the seat 20 can be saved by the control module 26 (by another driver, for example) using the customization selector 24 in the same manner described above, thereby saving the position of the repositioned seat as a second predetermined position. The customization selector 24 can be any suitable selector, such as any suitable button or switch. The customization selector 24 can also be embodied in a mobile electronic device application. The customization selector 24 can still further be configured to receive voice commands for saving particular positions of the seat 20 as predetermined positions, such as first or second predetermined positions.

In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The vehicle 10 further includes a driver's side mirror 30A and a passenger's side mirror 30B. The position of the mirrors 30A and 30B can be controlled using a mirror control 32. The mirror control 32 can be any suitable control for actuation of the mirrors 30A and 30B, such as any suitable button, switch, touchpad, joystick, etc. The vehicle 10 can further include a rearview mirror 34, the position of which can be controlled by rearview mirror control 36. The positions of the mirrors 30A, 30B, and 34 can be saved by the control module 26. Any suitable number of different mirror positions can be saved and associated with saved positions of the seat 20. For example, when a user uses the customization selector 24 to save a particular position of the seat 20 as a predetermined position, as described above, the current position of the mirrors 30A, 30B, and 34 at the time the position of the seat 20 is saved as a first predetermined position can be saved in association with the first predetermined position. Similarly, the position of the mirrors 30A, 30B, and 34 when the position of the repositioned seat 20 is saved as a second position may be saved in association with the second predetermined position.

The vehicle 10 further includes a steering wheel 40, which can be moved by a user using steering wheel control 42. Using the steering wheel control 42, the steering wheel 40 can be raised, lowered, extended, or retracted, for example. The control module 26 can save the position of the steering wheel 40 in association with any saved position of the seat 20. For example, when a user saves a position of the seat 20 as a first predetermined position using the customization selector 24, the current position of the steering wheel 40 will be saved by the control module 26 in association with the first predetermined position of the seat. Likewise, the position of the steering wheel 40 when the repositioned seat 20 is saved as a second predetermined position will be saved by the control module 26 in association with the second predetermined position.

The vehicle 10 can include any suitable HVAC system. Airflow from the HVAC system enters a passenger cabin of the vehicle 10 through one or more of a plurality of registers 50 arranged throughout the passenger cabin of the vehicle 10. With additional reference to FIG. 2, each one of the registers 50 includes a plurality of directionals, which are movable to direct airflow to a location desired by an occupant of the vehicle 10, such as the driver. The directionals can include, for example, horizontal louvers 52 and vertical louvers 54. The horizontal louvers 52 can be rotated upward to direct airflow higher, and can be rotated downward to direct airflow lower. The vertical louvers 54 can be rotated from side to side, such as left to direct the airflow left, and right to direct the airflow right.

The horizontal and vertical louvers 52 and 54 can be controlled in any suitable manner. For example, an up/down control 56 can be included for moving the horizontal louvers 52 up or down. The up/down control 56 can be any suitable control, such as a button or switch, for controlling a motor 58. The motor 58 is any suitable motor, such as a servo motor, for actuating the horizontal louvers 52 upward and downward. A right/left control 60 is included for operating a motor 62, which can be a servo motor, for example. The motor 62 rotates the vertical louvers 54 left and right in response to actuation of the right/left control 60.

Once a user positions the horizontal and vertical louvers 52 and 54 to provide a desired airflow, the position of the louvers 52 and 54 is saved by the control module 26. The control module 26 is configured to store a plurality of different positions of the horizontal and vertical louvers 52 and 54. A user, or plurality of different users, can recall any one of the stored positions of the horizontal and vertical louvers 52 and 54 from the control module 26 in any suitable manner, such as by using the customization selector 24 as described herein, or by using any other suitable interface. The control module 26 will then operate one or both of the motors 58 and 62 in an appropriate manner to move the horizontal and vertical directionals 52 and 54 to the position desired by the user.

The customization selector 24 can be used to input saved positions of the horizontal and vertical louvers 52 and 54 to the control module 26, and can also be used to recall saved positions of the horizontal and vertical louvers 52 and 54. Saved positions of the horizontal and vertical louvers 52 and 54 can be associated with saved positions of the seat 20, as well as saved positions of one or more of the mirrors 30A, 30B, and 34, and/or saved positions of the steering wheel 40. For example, when a user, such as a first driver, positions the seat 20 (and optionally the mirrors 30A, 30B, and 34, and/or the steering wheel 40) to positions of his or her liking, and saves the positions to the control module 26 by using the customization selector 24 (such as by holding the selector 24 for a predetermined period of time) the current positions of the horizontal and vertical louvers 52 and 54 will also be saved to the control module 26 along with the position of the seat 20 (and optionally positions of the mirrors 30A, 30B, and 34 and/or steering wheel 40) as first predetermined positions. Another driver may reposition the seat 20 (and optionally the mirrors 30A, 30B, 30C and/or the steering wheel 40), as well as the horizontal and vertical louvers 52 and 54. The second driver can save these new positions to the control module 26 as second predetermined positions using the customization selector 24. Thereafter, the saved first and second predetermined positions can be readily recalled by the customization selector 24. Although only first and second predetermined positions are described, any suitable number of predetermined positions can be stored.

Figure 2:
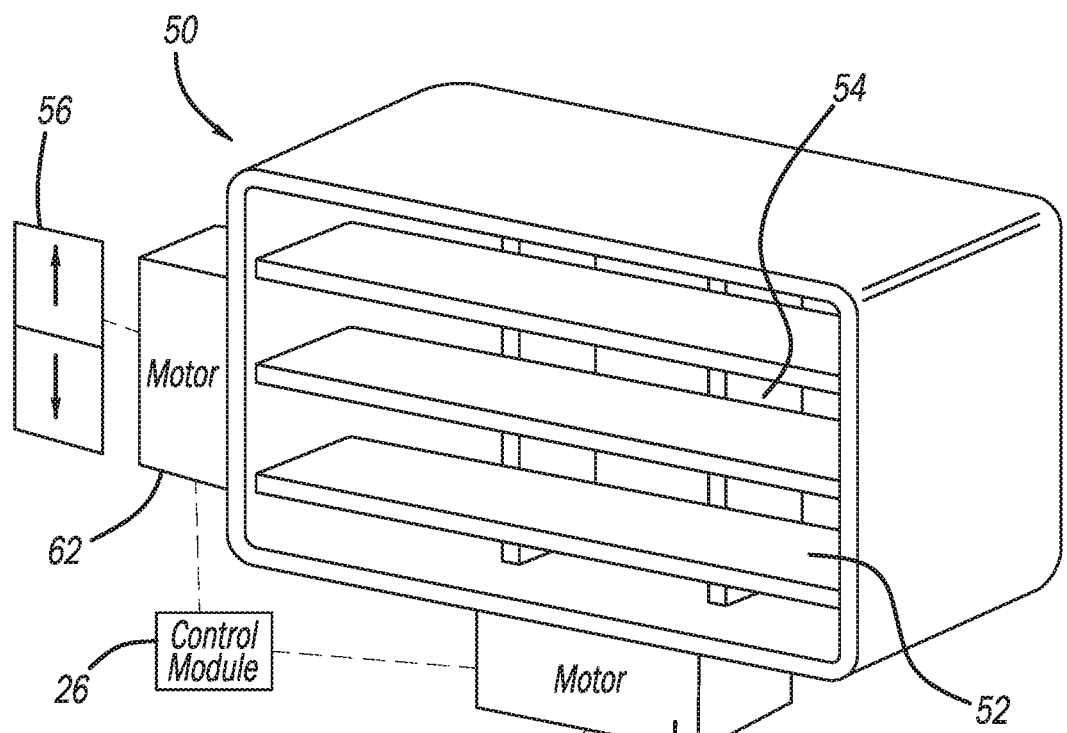
FIG. 2 illustrates an exemplary HVAC register of the HVAC register positioning system according to the present teachings.
Figure 3:
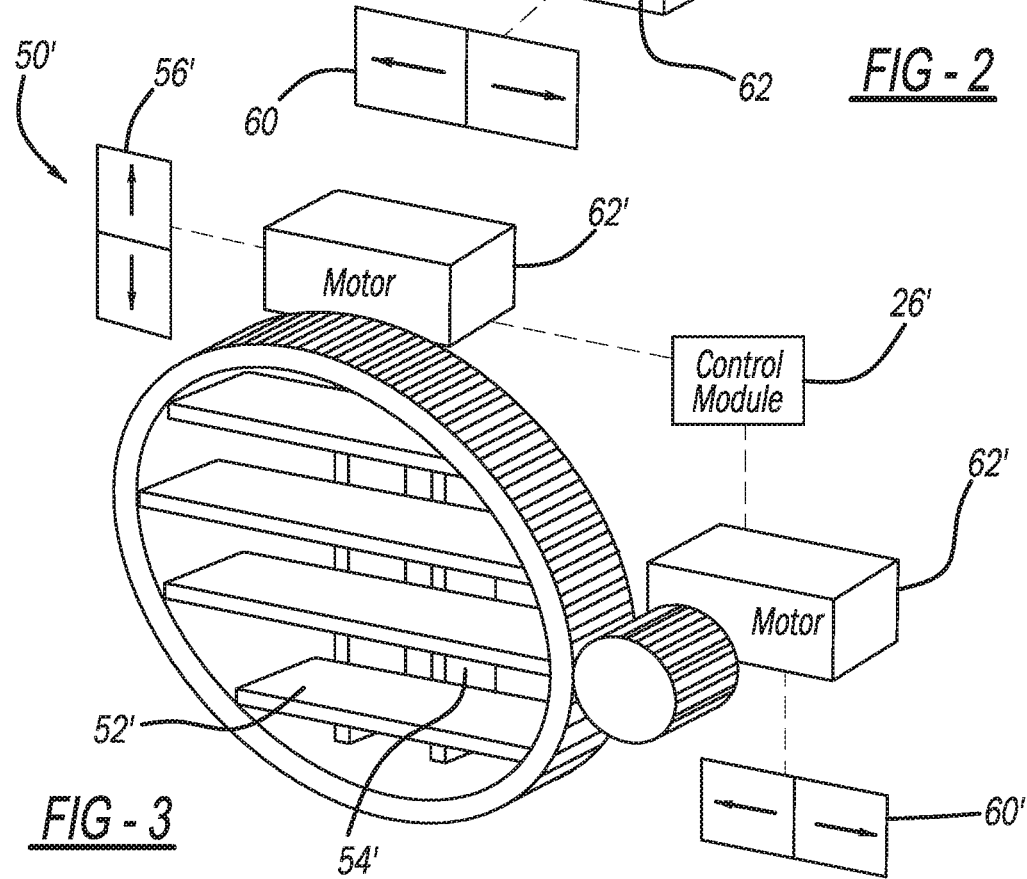
FIG. 3 illustrates another exemplary HVAC register of the HVAC register positioning system according to the present teachings.

Although the exemplary register 50 of FIG. 2 is illustrated as rectangular, the register 50 can have any other suitable shape or configuration. For example and with reference to FIG. 3, the present teachings are applicable to a circular register 50'. The circular register 50' includes numerous components that are the same as, or similar to, components included with the register 50. These same or similar components are designated in FIG. 3 with the same reference numbers of FIG. 2, but include the prime (') suffix. The description of the same or similar components set forth above in conjunction with the description of the register 50 also applies to the register 50'.

The present teachings provide numerous advantages. For example, the present teachings eliminate the need to manually adjust the horizontal and vertical louvers 52 and 54 each time a new driver operates the vehicle 10. Furthermore, a single driver may save various different positions of the horizontal and vertical louvers 52 and 54 to the control module 26. The user can then recall the different positions of the horizontal and vertical louvers 52 and 54 based on, for example, environmental conditions. For example, the user can recall positions of the horizontal and vertical louvers 52 and 54 that will direct airflow away from him/her, or towards him/her, as appropriate to ensure maximum comfort.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for controlling airflow of a heating, ventilation, and air conditioning (HVAC) system comprising:
    a register including horizontal louvers and vertical louvers for controlling airflow through the register;
    a first motor connected to the register and configured to move the horizontal louvers;
    a second motor connected to the register and configured to move the vertical louvers;
    a first button connected to the first motor to control the first motor, actuation of the first button by a user changes position of the horizontal louvers;
    a second button connected to the second motor to control the second motor, actuation of the second button by the user changes position of the vertical louvers;
    a seat control for selecting one of a first seat position and a second seat position; and
    a control module configured to:
        store predetermined louver positions of the horizontal louvers set using the first button, store predetermined louver positions of the vertical louvers set using the second button, and control the first motor to move the horizontal louvers and the second motor to move the vertical louvers to the predetermined louver positions set by the user in response to receipt of a user command;
        store the first seat position and the second seat position;
        associate each one of the predetermined louver positions with the first seat position or the second seat position;
        in response to selection of the first seat position by way of the seat control, move the seat to the first seat position and control the first motor and the second motor to move the horizontal louvers and the vertical louvers to the predetermined louver positions associated with the first seat position; and
        in response to selection of the second seat position by way of the seat control, move the seat to the second seat position and control the first motor and the second motor to move the horizontal louvers and the vertical louvers to the predetermined louver positions associated with the second seat position.

2. The system of claim 1, wherein the first motor is a first servo motor that moves the horizontal louvers, and the second motor is a second servo motor that moves the vertical louvers.

3. The system of Claim 1, wherein the seat control includes at least one of a button, mobile electronic device application, and voice command.

4. A system for controlling airflow of a heating, ventilation, and air conditioning (HVAC) system comprising:
    a register including horizontal louvers and vertical louvers for controlling airflow through the register;
    a first motor connected to the register and configured to move the horizontal louvers;
    a second motor connected to the register and configured to move the vertical louvers;

a first button connected to the first motor to control the first motor, actuation of the first button by the user changes position of the horizontal louvers;

a second button connected to the second motor to control the second motor, actuation of the second button by the user changes position of the vertical louvers;

a seat control for selecting one of a first seat position and a second seat position;

a steering wheel control for moving a steering wheel;

a mirror control for moving a mirror; and a control module configured to:

associate the first seat position with each of a first vertical louver position, a first horizontal louver position, a first steering wheel position, and a first mirror position;

associate the second seat position with each of a second vertical louver position, a second horizontal louver position, a second steering wheel position, and a second mirror position;

in response to selection of the first seat position by way of the seat control, move the seat to the first seat position, move the steering wheel to the first steering wheel position, and move the mirror to the first mirror position; and in response to selection of the second seat position by way of the seat control, move the seat to the second seat position, move the steering wheel to the second steering wheel position, and move the mirror to the second mirror position.

5. The system of claim 4, wherein the first motor and the second motor are servo motors.

6. The system of Claim 4, wherein the customization selector includes at least one of a button, mobile electronic device application, and voice command.

7. The system of claim 4, wherein the register including the horizontal louvers and the vertical louvers is one of a plurality of registers each including horizontal louvers and vertical louvers.

* * * * *